United States Patent
Anderson et al.

(10) Patent No.: US 8,054,547 B2
(45) Date of Patent: Nov. 8, 2011

(54) REAR PROJECTION DOME

(75) Inventors: Glyn H. Anderson, Rio Rancho, NM (US); Janeen D. Anderson, Rio Rancho, NM (US); Joshua W. Perkins, Albuquerque, NM (US); Jeffrey W. Bryce, Albuquerque, NM (US)

(73) Assignee: Acaji, Inc., Albuquerque, NM (US)

( * ) Notice: Subject to any disclaimer, the term of this patent is extended or adjusted under 35 U.S.C. 154(b) by 0 days.

(21) Appl. No.: 13/079,966

(22) Filed: Apr. 5, 2011

(65) Prior Publication Data

US 2011/0249330 A1    Oct. 13, 2011

Related U.S. Application Data

(60) Provisional application No. 61/322,433, filed on Apr. 9, 2010.

(51) Int. Cl.
  *G03B 21/56* (2006.01)
  *H04N 5/74* (2006.01)

(52) U.S. Cl. .......................... 359/460; 359/461

(58) Field of Classification Search ............ 348/383, 348/36, 789; 52/6, 8, 80.1, 81.1–81.5, 82, 52/91.1; 352/69–71; 358/231; 353/30, 94; 359/451, 60
See application file for complete search history.

(56) References Cited

U.S. PATENT DOCUMENTS

| | | | | |
|---|---|---|---|---|
| 2,273,074 A | * | 2/1942 | Waller | 359/451 |
| 3,768,218 A | * | 10/1973 | Blaski | 52/81.5 |
| 3,925,940 A | * | 12/1975 | O'Connell et al. | 52/81.1 |
| 3,999,336 A | * | 12/1976 | Bance | 52/81.3 |
| 4,301,627 A | * | 11/1981 | Wilson | 52/6 |
| 4,736,553 A | * | 4/1988 | Geiger | 52/81.2 |
| 4,885,878 A | * | 12/1989 | Wuu | 52/6 |
| 5,067,288 A | * | 11/1991 | Takahama et al. | 52/81.2 |
| 5,097,640 A | * | 3/1992 | Skolnick et al. | 52/81.3 |
| 5,170,599 A | * | 12/1992 | Knight | 52/91.1 |
| 5,179,440 A | * | 1/1993 | Loban et al. | 348/383 |
| 5,724,775 A | * | 3/1998 | Zobel et al. | 52/82 |
| 6,832,455 B1 | * | 12/2004 | Tomlinson et al. | 52/259 |
| 6,909,543 B2 | * | 6/2005 | Lantz | 359/451 |
| 2010/0220296 A1 | * | 9/2010 | DePoar | 353/30 |
| 2010/0300006 A1 | * | 12/2010 | Magpuri | 52/8 |
| 2011/0170074 A1 | * | 7/2011 | Ferren et al. | 353/94 |

* cited by examiner

*Primary Examiner* — Clayton E Laballe
*Assistant Examiner* — Kevin Butler
(74) *Attorney, Agent, or Firm* — Sanford Astor; Lewis Brisbois Bisgaard & Smith (57) ABSTRACT

A seamless, shadowless, rear projection full dome imaging system comprising a 360° screen having a plurality of translucent screen sections, a rigid superstructure to which the screen sections are attached; clamping rings to hold the screen sections together; clamp arms to attach the screen sections to the superstructure, a transparent light guide attached to each clamping ring; adjacent screen sections being held between adjacent light guides by clamp arms; a plurality of projectors projecting a light image onto the rear of the screen sections; the light guides having a rear face angled perpendicular to the projected light; and a narrow front edge on the front side of the light guide. All surfaces of the light guides, except the rear face and the narrow front edge, are coated with a black opaque finish.

18 Claims, 11 Drawing Sheets

REAR PROJECTION DOME

This application claims the benefit of U.S. Provisional Patent Application Ser. No. 61/322,433, filed Apr. 9, 2010, which application is incorporated herein by reference in its entirety.

FIELD OF THE INVENTION

The present invention comprises a rear-projected full dome for use as an immersive environment and visualization platform.

BACKGROUND OF THE INVENTION

Domed imaging systems are known and used for both entertainment and training. These systems utilize a plurality of projectors, which can be front projection or rear projection projectors. Large domes that can be used for training, such as military training, are particularly difficult to assemble and create a realistic 360° image, without seams in the screen being visible and without image problems.

Inflated domes (positive pressure) and domes inside of evacuated chambers (negative pressure) have been suggested but there is no physical support structure for the screen. U.S. Pat. No. 5,179,440 describes a "dome" made of trapezoidal-shaped screen panels or facets. Stiffeners are used to hold pieces of the screen material together. The stiffeners are straight pieces of a clear material, such as acrylic, which are attached to a superstructure using springs, providing a less than rigid structure. Light passes through the tips of the stiffeners but they do not guide the light in any manner.

BRIEF DESCRIPTION OF THE INVENTION

Applicants' invention comprises a rear-projected full multifunction translucent dome which provides up to a 360°× 180° display that can be constructed in a range of sizes. The multifunction dome is built by suspending a number of sections of flexible rear-projection screen material using a rigid frame structure. The rigid structure holds the screen material in a fixed configuration. Projectors are then arrayed around the outside in rows, to project onto the exterior surface of the screen material, and the projected image is visible from inside the dome.

A clamping mechanism holds the screen material in place without casting shadows. The seams between screen sections are minimized using "light guides" as further described herein.

BRIEF DESCRIPTION OF THE DRAWINGS

The present invention may be better understood by reading the detailed description of the preferred embodiment with reference to the drawings, wherein.

DESCRIPTION OF THE PREFERRED EMBODIMENT

Figure 1:
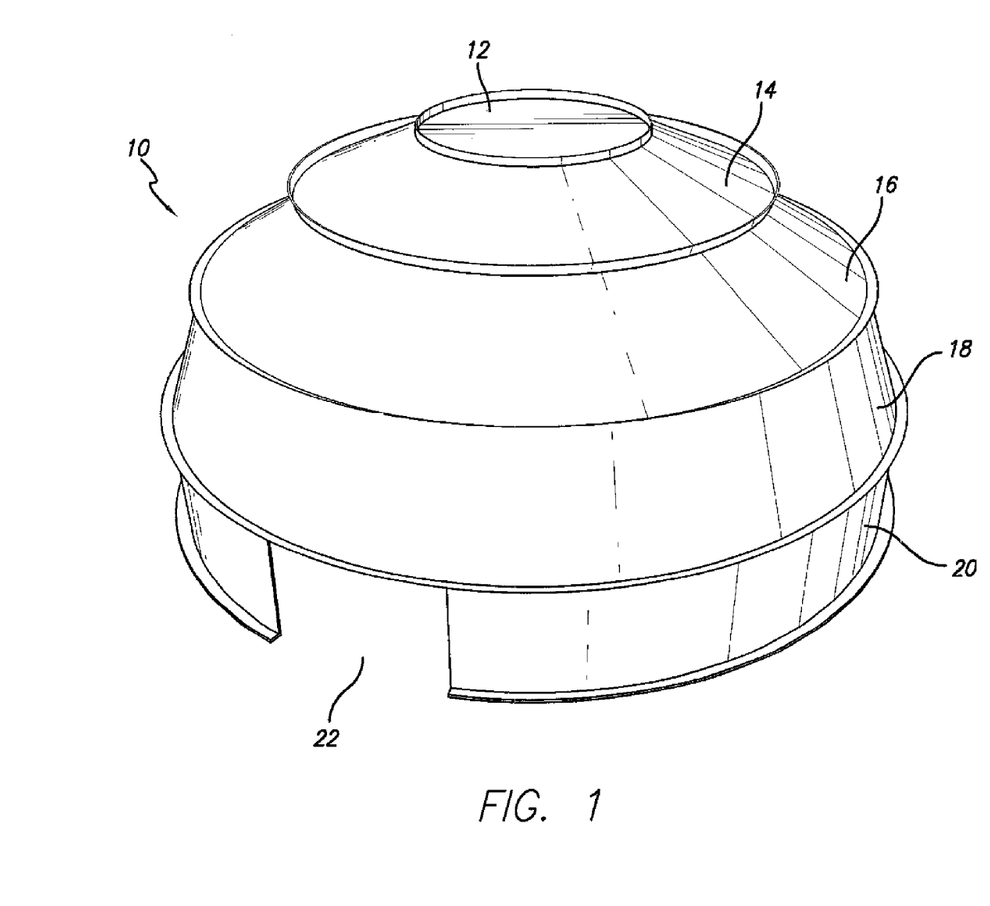
FIG. 1 is a perspective view of the rear projection dome of the present invention.
Figure 2:
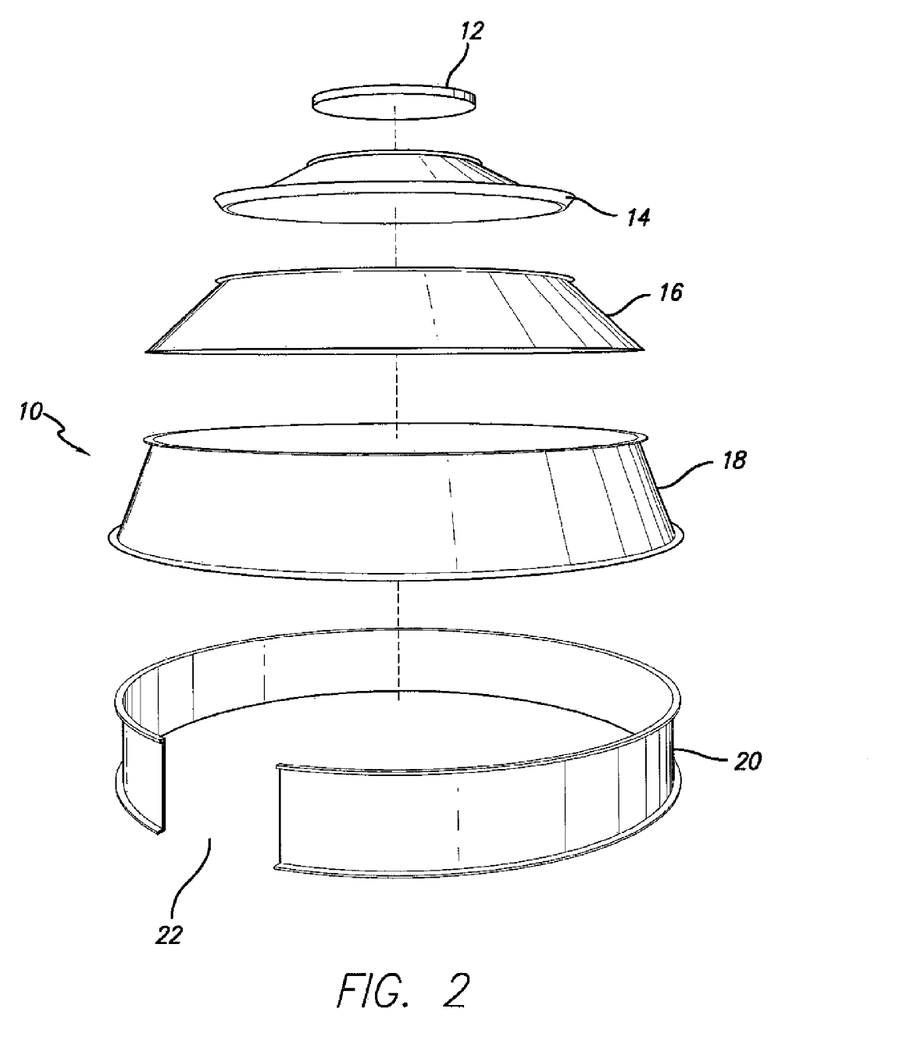
FIG. 2 is an exploded perspective view.

Referring now to FIGS. 1 and 2, there is shown the rear projection dome 10 of the present invention. The dome comprises five sections, a cap section 12, an upper conical section 14, a middle conical section 16, a lower conical section 18 and a cylindrical base section 20. Cylindrical base section 20 has a doorway 22, for entering into the dome.

Each of the sections, as shown, comprise the screen material, which may be made of cloth or a vinyl fabric such as DaLite Inc's Da-Tex®. The sections shown in FIGS. 1 and 2 are each a single sheet of screen material. The ends of each sheet are clamped together by vertical clamps, described below, to create a section of the dome. Another embodiment would have each section as a single closed sheet of material (no left or right edge). In this case there are no vertical clamps.

Referring now to FIGS. 3-15 inclusive, there is shown the clamping systems which hold the entire dome screen together. The clamping mechanism for cap 12 and upper conical sections 14, 16 and 18 comprises multiple pairs of clamping rings, generally 24, FIGS. 3 and 4, which act as light guide support brackets, described below, using clamp arms 31, FIG. 5. Clamp arms 41 for the connection of sections 18 and 20 only, are shown in FIG. 6.

Screen material 48, 49 is threaded between the pairs of clamping rings, (40, 42 in FIG. 6) the top edge of one screen section 48 and the bottom edge of another screen section 49. The screen material is tensioned by tying cord 82 between grommets 80 in the edge of the screen material and the support structure 84, described below and shown in FIGS. 12 and 13. Then, the clamping rings 40, 42 are clamped together to hold the two pieces of screen material in place, and to minimize the visible seam between them.

Figure 9:
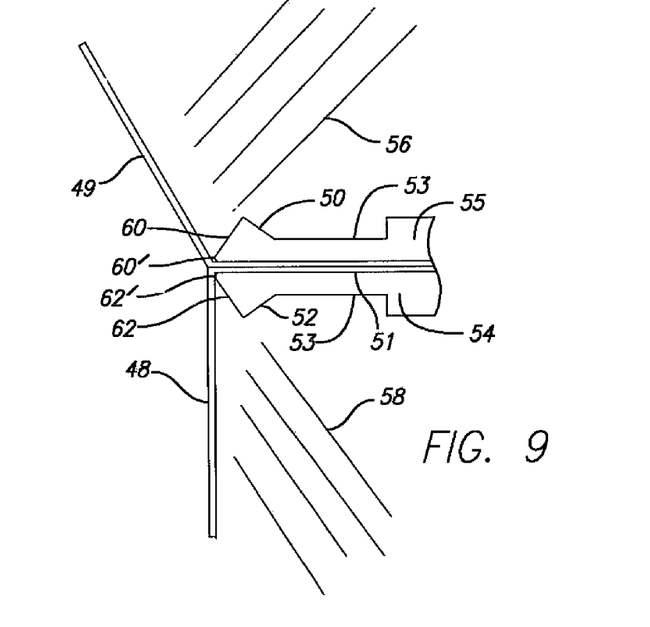
FIG. 9 is a depiction of a light guide.
Figure 10:
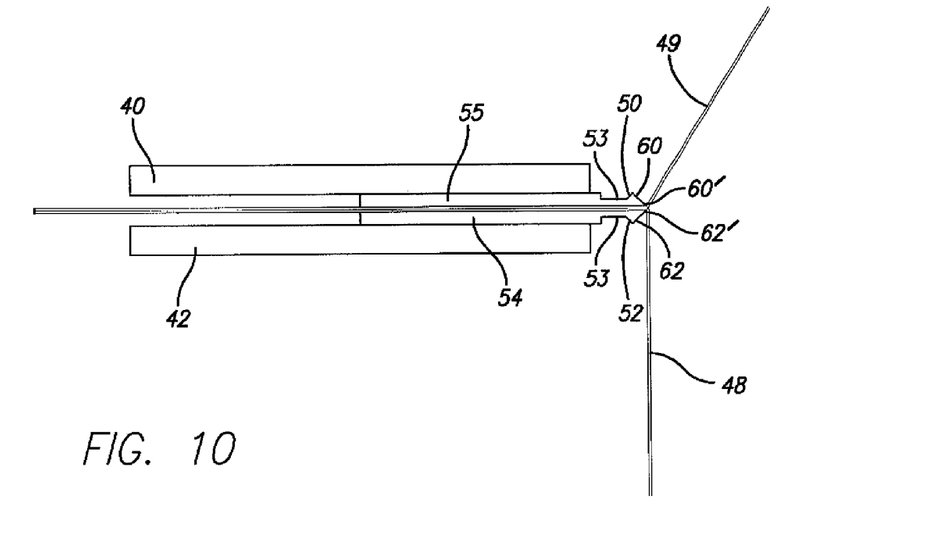
FIG. 10 is a side elevation of a light guide.
Figure 11:
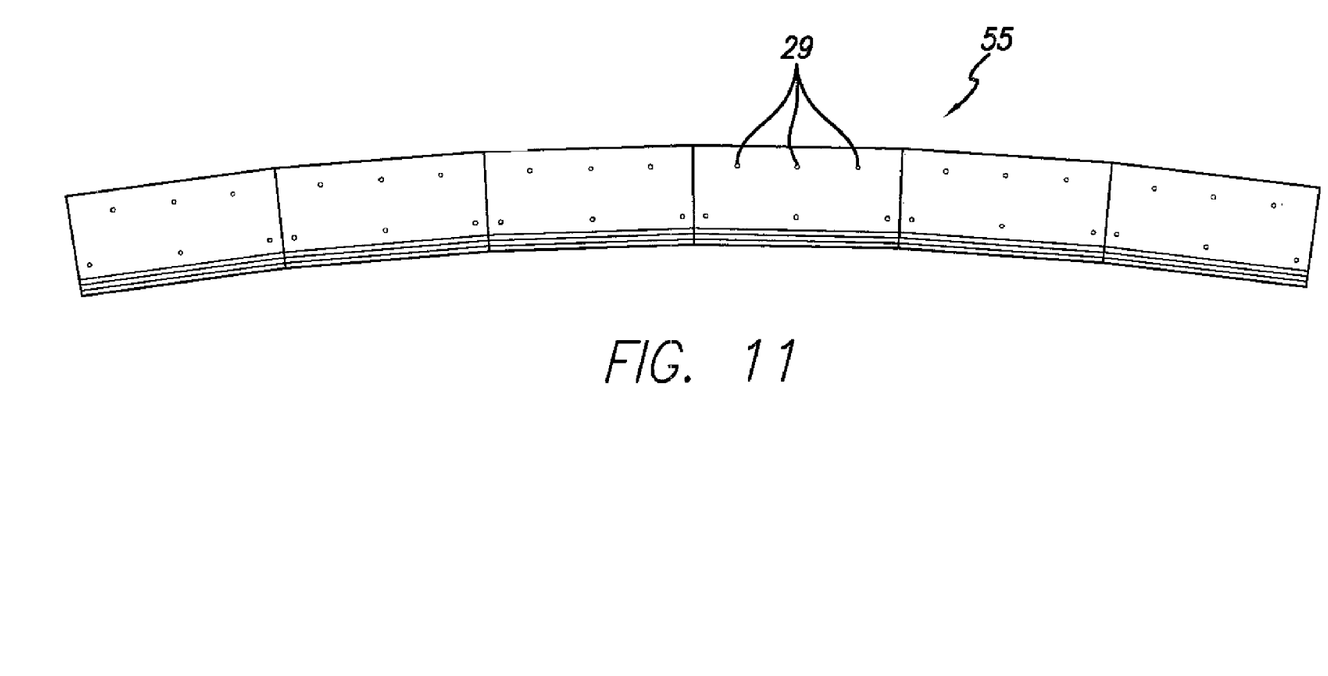
FIG. 11 is a top plan view of a series of light guides.

Placed between clamping rings 40, 42 are a pair of light guides 54, 55, shown in detail in FIGS. 9 and 10. Lower light guide 54 is attached to clamping ring 42 and upper light guide 55 is attached to upper clamping ring 40. Light guides 54, 55 are attached to clamping rings 42, 40 by screws (not shown) which fit through a plurality of screw holes 27 in clamping ring 40, into a plurality of matching light guide screw holes 29 in light guide 55 and screw holes 28 in clamping ring 42, into matching light guide screw holes 30 in light guide 54.

Figures 3, 4:
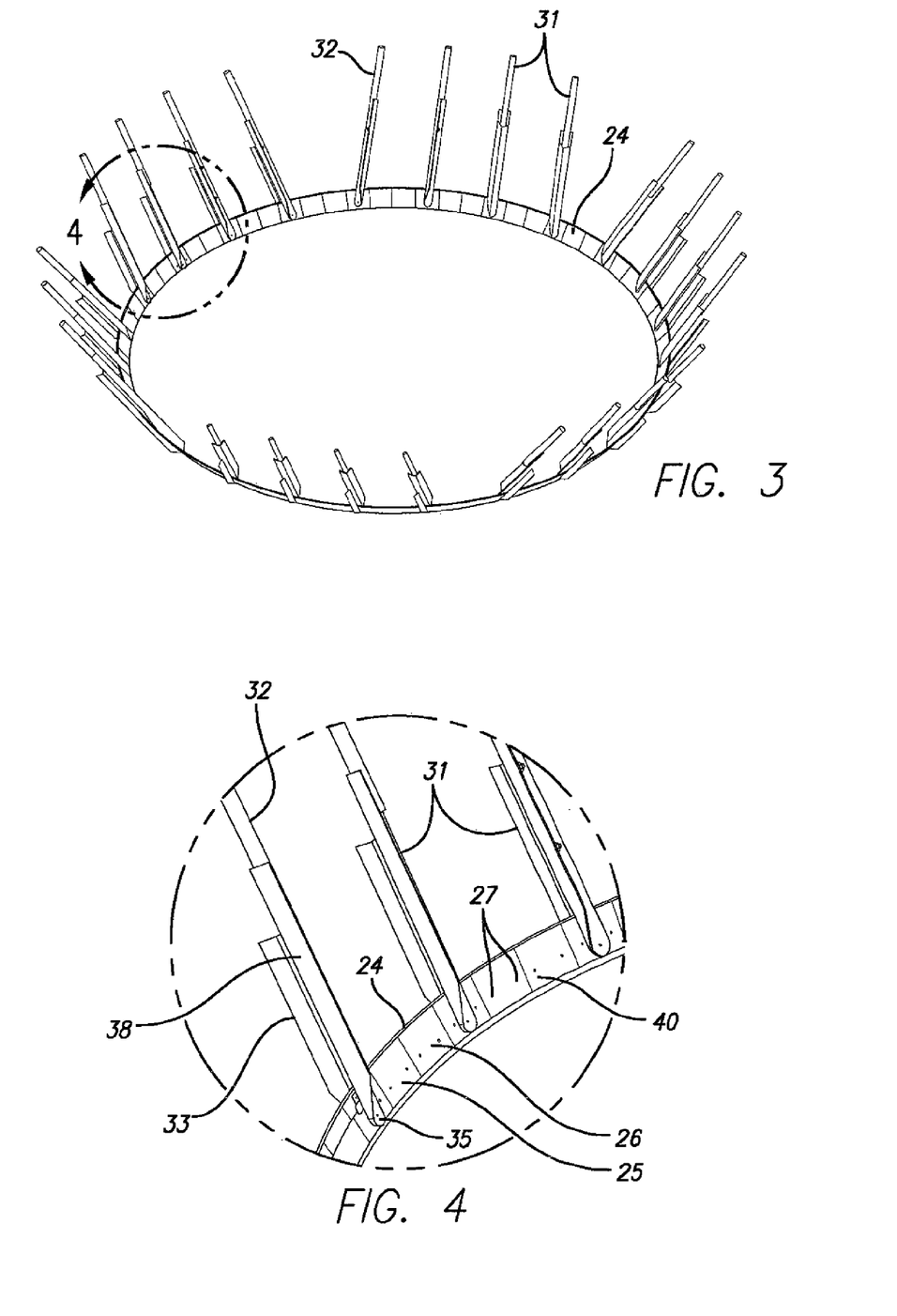
FIG. 3 is a perspective view of one clamping ring.
FIG. 4 is a detailed view of portion 4 of FIG. 3.

Each clamping ring 40, 42 is built out of segments having a plurality of facets, such as 25, 26, shown in FIG. 4. The ends of adjacent segments mate together under the forward ends 35 of clamp arms 31 along a non-linear edge, in a tongue and groove fit. The non-linearity allows the segments to separate slightly prior to being clamped together. This aids in inserting the screen segments 48, 49 in the space 51 between the light guides 54, 55 held by the clamping rings 48, 49. The upper clamping ring segments 40 are bolted together and the lower clamping ring segments are left loose. Because the segments can move apart, but not separate, it avoids pinching the screen material and it is easier to insert the screen material between the light guides 54, 55. After the screen material is inserted, the lower clamping ring segments 42 are bolted together.

Additionally, the two clamping rings 40, 42 are mounted so that their segments are out of phase with each other (like blocks in a wall). This phase shift prevents segment joins from coinciding and producing a possible shear in the screen material, which might occur if the ends of the rings coincide.

The angle at which clamping rings 40, 42 approach the screen is determined so as to insure that clamping rings 40, 42 do not interfere with the cone of projected light from the projector. This prevents clamping rings 40, 42 from casting a shadow on the screen. One way that this can be accomplished is for the clamping rings to bisect the obtuse angle formed by the two pieces of screen material that it holds together. In practice, any angle that prevents a shadow is acceptable.

Figure 5:
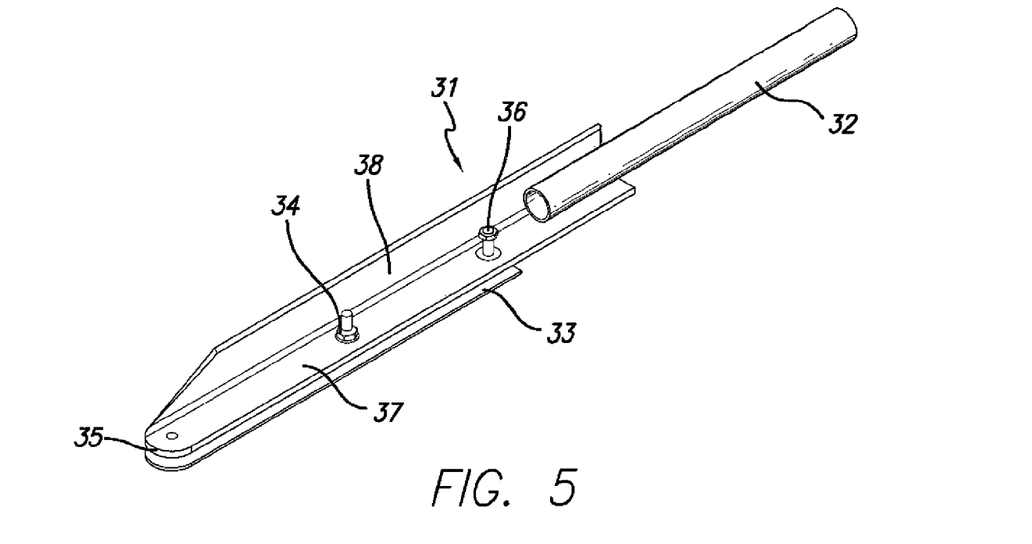
FIG. 5 is a perspective view of a clamping arm for an upper portion of the dome.
Figure 6:
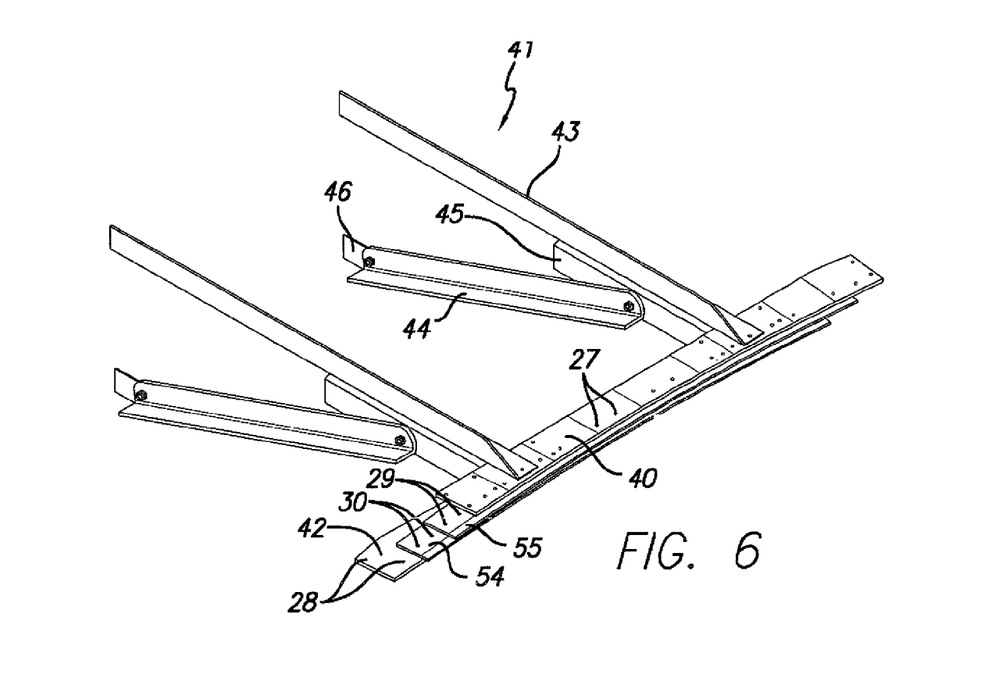
FIG. 6 is a perspective view of a clamping arm for a lower portion of the dome.

FIG. 5 shows a clamp arm 31 used to hold clamping rings 40, 42 in a conical shape, which holds the upper conical screen sections. Clamp arm 31 comprises an upper L-shaped clamping plate with faces 37 and 38, and a lower clamping plate 33, also L-shaped. A clamping arm extension 32 is fixedly attached to upper plate 37, 38 by welding. Extension 32 of each clamping arm 31 is locked to the superstructure (see FIG. 19) to hold the screen in a fixed configuration.

Bolt 34 tightens down clamping plates 33 and 37 to hold the screen material. Bolt 36 is not tightened down as it is not needed to hold the screen material but serves as a pivot point for movement of clamping plates 33, 37.

Figures 7, 8:
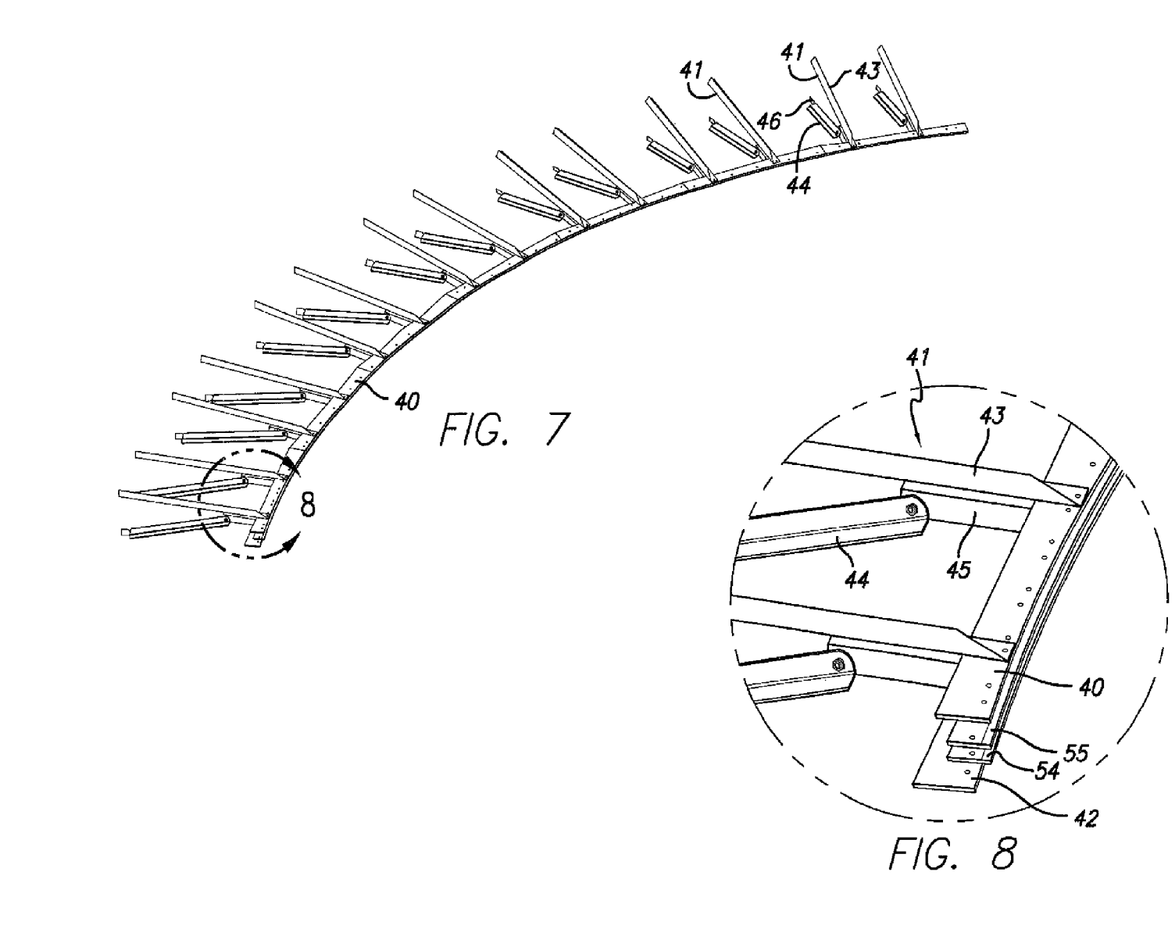
FIG. 7 is perspective view of a portion of the lower clamping ring.
FIG. 8 is a detailed view of portion 8 of FIG. 7.

FIGS. 6, 7 & 8 show the clamping arm 41 for the cylindrical base section 20 to be attached to the lower conical section 18. Clamping arm 41 is different than clamping arm 31 for the upper conical sections of the screen because the light guide clamping rings 40, 42 can lie flat and the clamping arm 41 can lie in a horizontal position. However, clamping rings 40, 42 holding light guides 54, 55 are the same as described for the upper conical sections.

Clamping arm 41 comprises a clamping plate 43, 45, both L-shaped, between which are held clamping rings 40, 42 which hold light guides 54, 55 for holding the screen. There are two bolts, which operate the same as described in FIG. 5, but are blocked from view in FIG. 6. A support arm 44, 46 attached to clamping plate 43, 45 attaches to the superstructure to hold the screen in a fixed configuration.

Light guides 54, 55 are machined from a piece of acrylic, or other suitable transparent material, such as plexiglass. Light guides 54, 55 are segmented (FIG. 11) and have a slightly trapezoidal shape, which allows them to abut each other, so that when placed end to end they will form a faceted circular shape, as shown in FIG. 3. The projector side of each light guide has a groove 53, FIGS. 9 and 10, machined in it, near the interior edge. On the rear side of light guides 54, 55, faces 50, 52 are angled so as to be perpendicular to the projected light rays 56, 58. The projected light rays 56, 58 (FIG. 9) enter the light guide through these faces, 50, 52.

Faces 60, 62 on the front side of light guides 54, 55 are tapered down to a narrow edge 60', 62' approximately the size of one pixel of the projected image. The projected light 56, 58 leaves the light guide through narrow edges 60', 62' and can be seen on the front side of the projection screen. Faces 60, 62 are angled to be parallel to the projected light rays 56, 58. This prevents faces 60, 62 from casting a shadow on the screen.

Only the rear faces 50, 52 and the narrow edges 60', 62' of the light guide remain transparent. The remainder of the light guides 54, 55, including faces 60, 62, are painted or coated with a matte black opaque finish. The finish prevents unwanted reflections and refractions of projected light onto the screen.

Figures 12, 13:
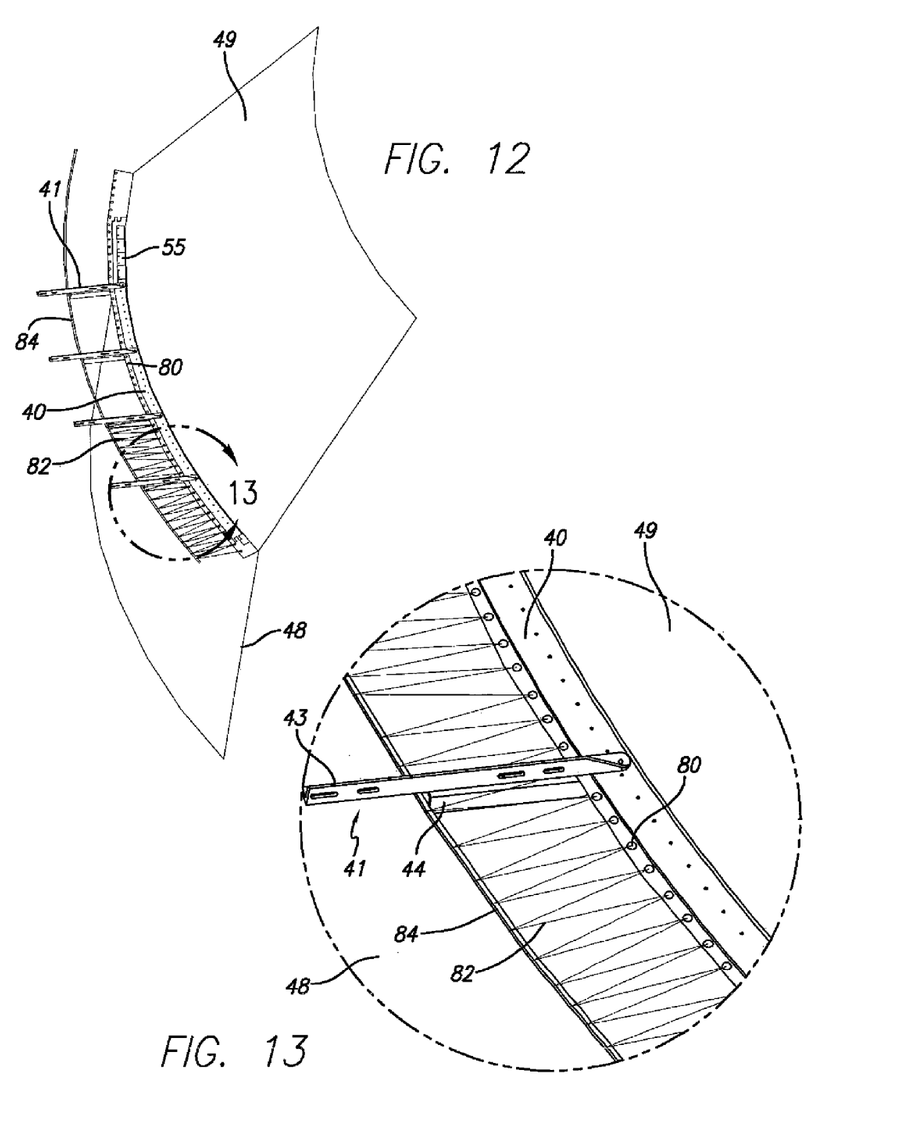
FIG. 12 is a depiction of the attachment of the screen to the superstructure.
FIG. 13 is a detailed view of portion 13 of FIG. 12.

Referring to FIGS. 12 and 13, there is shown the screen segments 48, 49 clamped together as described above, showing clamping ring 40. The edges of screens 48, 49 passing through the space between light guides 54, 55 have a plurality of grommets 80. Lacing cord 82 passes through grommets 80 and is attached to tie-back ring 84, which is part of the superstructure shown in FIG. 18. Clamp arm 41, having clamp plates 43 and 44 are clamped to hold clamping rings 40, 42 tightly together. By applying tension on lacing 82, and affixing clamp arms 41 to the superstructure, and similar clamp arms 31 for the upper conical sections, 360° around the structure, the entire screen is held tightly in place, to provide an excellent screen for rear projection to take place.

Figure 14:
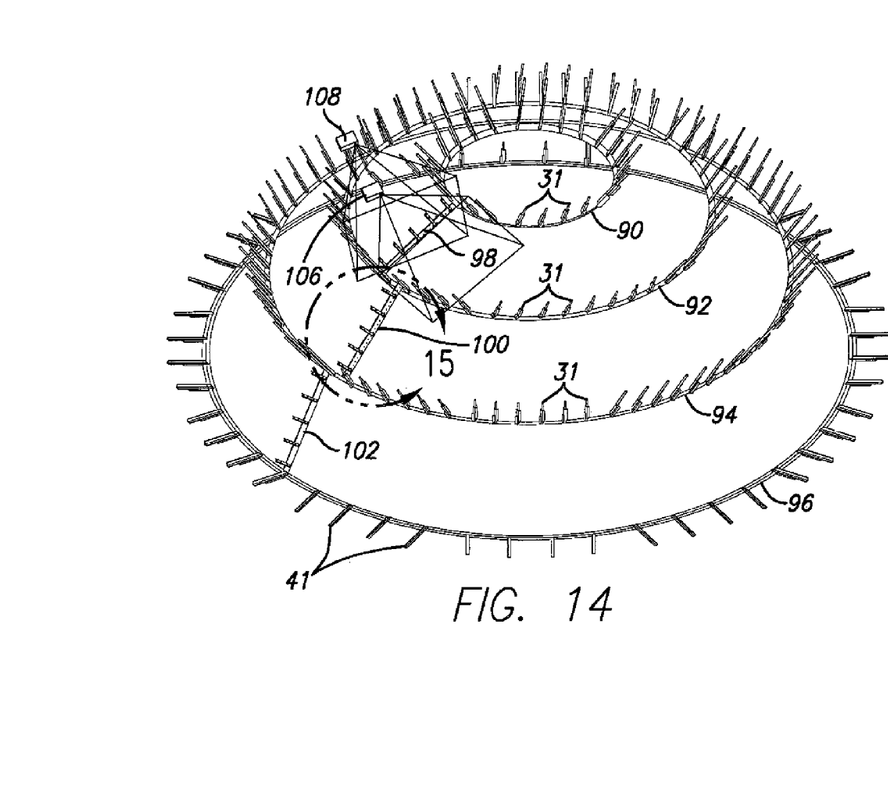
FIG. 14 is a depiction of the vertical clamping structure.
Figure 15:
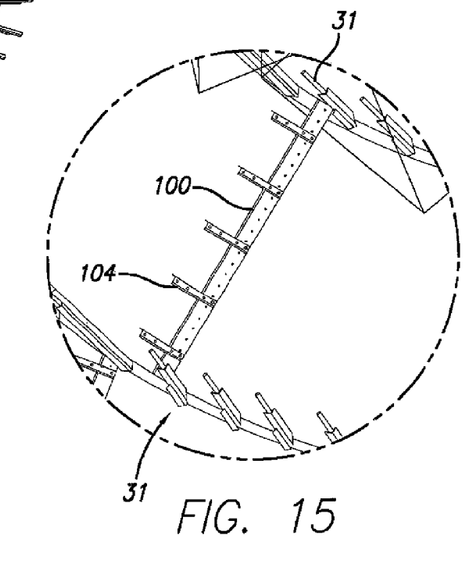
FIG. 15 is a detailed view of portion 15 of FIG. 14.

What has been described are the horizontal connections of the screen segments. There are also vertical connection of screen segments as shown in FIGS. 14 and 15. The vertical seams consist of a similar clamping mechanism, using light guides, that holds the left and right ends of each section of screen material together at the rear of the dome. The vertical seam is positioned to be in an area where the images from two adjacent projectors overlap.

Four circular clamping rings 90, 92, 94, 96, with clamping arms 31 on the upper conical sections and clamping arms 41 on the lower conical section, are depicted, without showing connections to the superstructure. Vertical clamping strips 98, 100, 102 are attached to conical clamping rings 90, 92, 94, 96. A plurality of vertical clamp arms 104 hold a pair of clamping strips holding a pair of light guides, the same structure as described for the horizontal clamping mechanism. However, the far ends of clamp arms 104 are not connected to any rebar or superstructure, they simply clamp the pair of clamping strips together.

The vertical seams are positioned so that the image projected on the screen by projectors 106 and 108, overlap in that region, thus illuminating the light guides on either side of the vertical seam, providing a "zero shadow seam".

Figure 16:
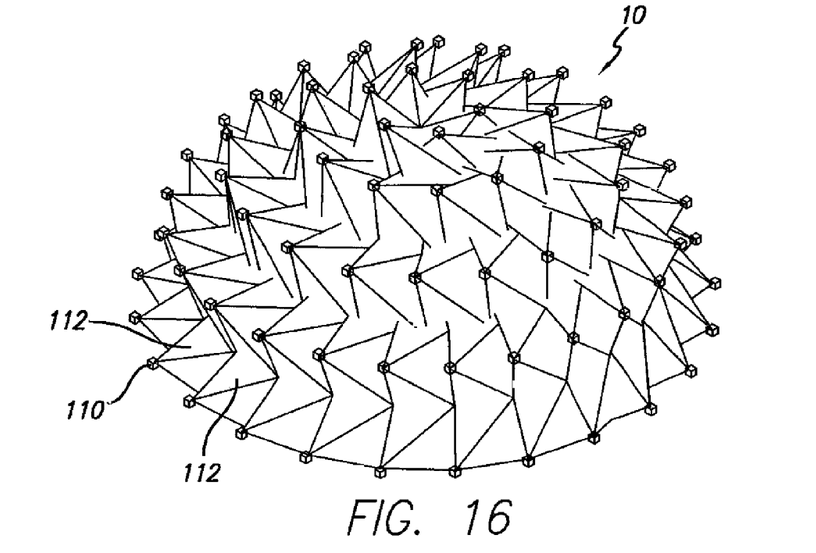
FIG. 16 is a depiction of the projection cones of the projectors.

Referring now to FIG. 16, there is shown a depiction of the rear projection dome 10 showing a plurality of projectors 110, and for each projector, the path 112 of its projected image. There are preferably a total of 84 projectors utilized, so that there is no element of the screen without a projected light image.

Figure 17:
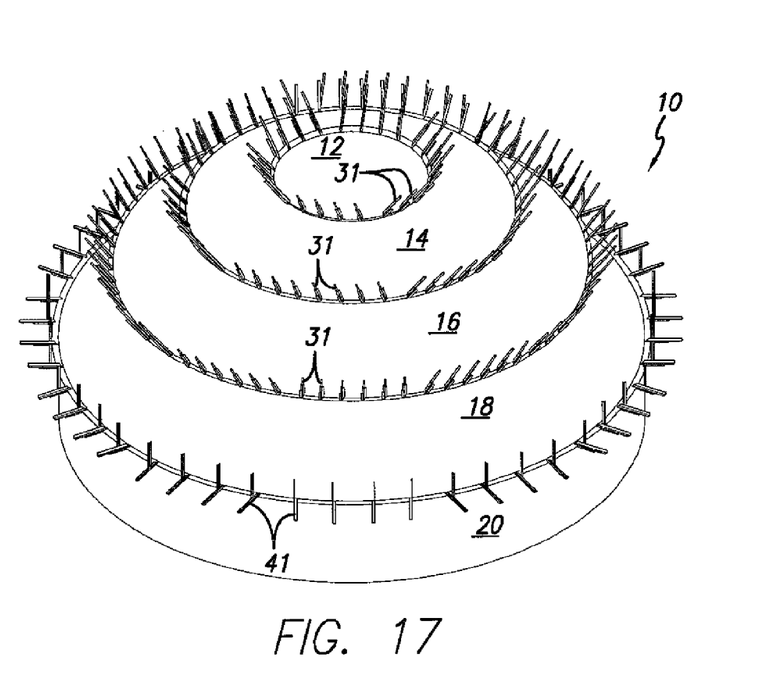
FIG. 17 is a depiction of the dome clamping mechanism.

Referring now to FIG. 17, there is shown a depiction of the rear projected dome 10 with all of the horizontal clamping mechanisms in place. As can be seen, the upper three sections 12, 14, 16 and the top of 18 utilize clamping arms 31, while the bottom of section 18 and top of section 20 use clamps 41. The bottom section 20 of the screen may have grommets, similar to those shown in FIGS. 12, 13, which are laced to a rigid curved rod or pipe (not seen) securely attached to the ground. Alternatively, the screen can be wrapped around this rod or pipe.

Figure 18:
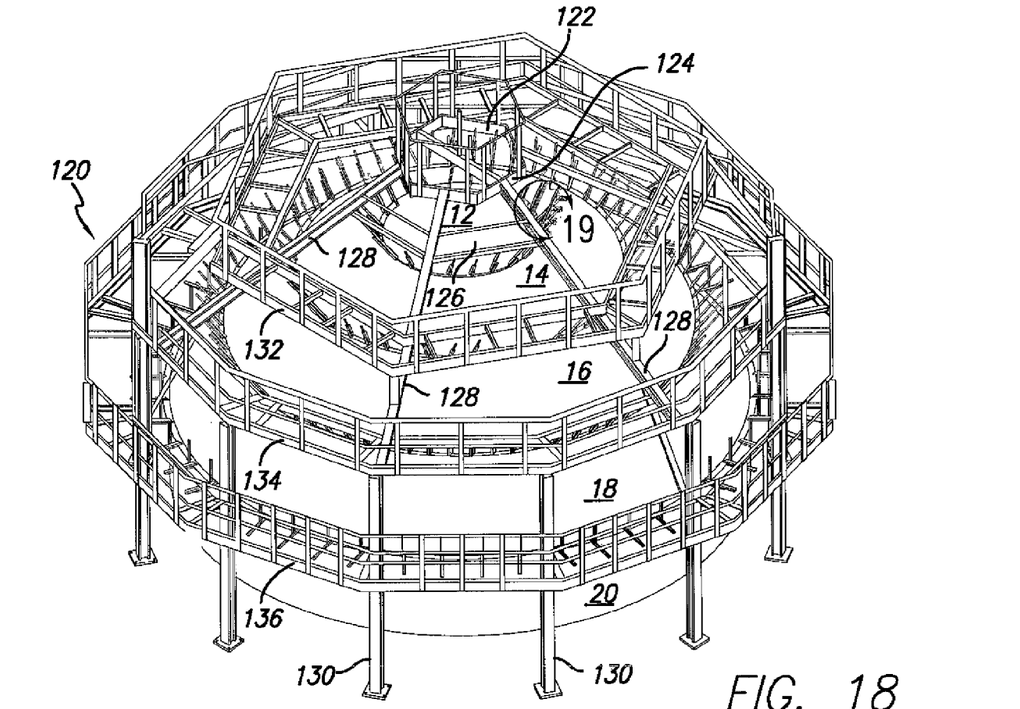
FIG. 18 is a depiction of the dome connected to the superstructure.
Figure 19:
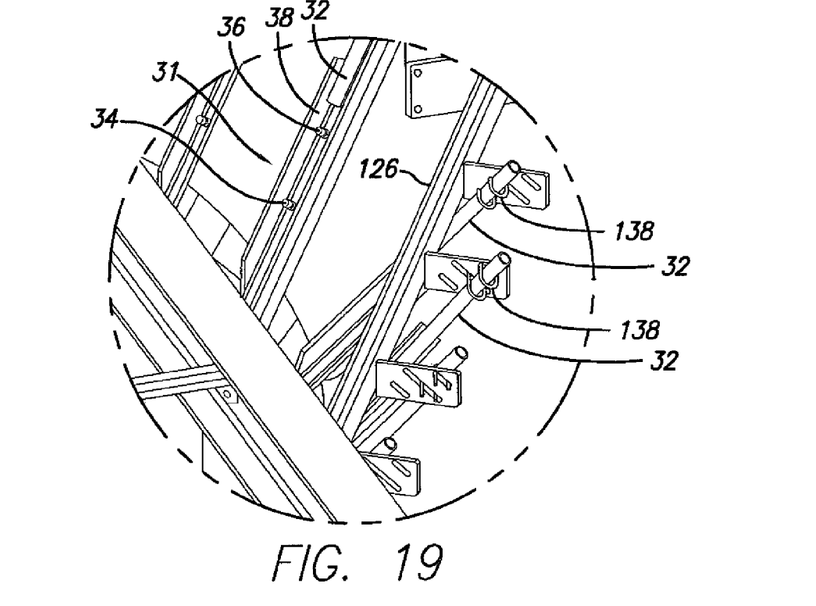
FIG. 19 is a detailed view of portion 19 of FIG. 18.

Referring now to FIGS. 18 and 19, there is shown a depiction of the superstructure 120, having a deck cage 122, below which is a compression ring 124. A frame 126 below deck cage 122 supports the upper row of projectors and clamping arms. Structural support arms 128 provide structural support for the superstructure. Vertical supports 130 also provide structural support for the superstructure.

There are three catwalks 132, 134 and 136, to which the clamping arms are attached, shown in more detail in FIG. 19. Clamping arm extensions 32 are attached to the superstructure by u-bolts 138. The clamping arms of each level are attached to the superstructure as shown in FIG. 19.

The rigid frame structure holds the screen material in a fixed, known configuration. When the plurality of projectors project their images onto the exterior surfaces of the screen, a seamless, shadowless image is visible on the inside of the dome.

While only selected embodiments in accordance with the present invention are shown and described in this disclosure and its appended drawing figures, it is understood that the same is not limited thereto, but is susceptible to changes and modifications as known to one having ordinary skill in the art, and therefore this disclosure should not be limited to the details shown and described herein, but instead should cover all such modifications and changes as are encompassed by the scope of the appended claims.

We claim:

1. A seamless, shadowless, rear projection dome imaging system comprising:
    a) a 360° screen having a plurality of translucent screen sections;
    h) a rigid superstructure to which the screen sections are attached;
    c) clamping rings to hold the screen sections together;
    d) clamp arms to attach the screen sections to the superstructure;
    e) a pair of adjacent light guides held by the clamping rings;
    f) adjacent screen sections being held between said adjacent light guides;
    g) an array of projectors projecting a light image onto the rear of said screen sections;
    h) each of said light guides having rear faces, angled to be perpendicular to the projected light, through which the projected light enters the light guide, and narrow front edges, through which the projected light leaves the light guides;
    i) all surfaces of said light guides, except the rear faces angled perpendicular to the projected light and the narrow front edges, being coated with a black opaque finish.

2. The rear projection dome of claim 1 in which the screen sections comprise a cap section, a plurality of conical sections and a cylindrical section.

3. The rear projection dome of claim 1 in which the screen material is tensioned by tying cord between grommets in the edge of the screen and the superstructure.

4. The rear projection dome of claim 1 in which each clamping ring is made of segments having a plurality of facets.

5. The rear projection dome of claim 4 in which adjacent segments of the clamping rings mate together along a non-linear edge, in a tongue and groove fit.

6. The rear projection dome of claim 4 in which the clamping ring segments are out of phase with each other.

7. The rear projection dome of claim 4 in which each clamping arm comprises an extension which is locked to the superstructure.

8. The rear projection dome of claim 1 in which the light guides are made of a transparent material.

9. The rear projection dome of claim 8 in which the light guides are segmented and have a trapezoidal shape, so that when they are placed end to end they will form a faceted circular shape.

10. The rear projection dome of claim 1 in which the narrow edges on the front side of the light guides are tapered down to about the size of one pixel of the projected image.

11. The rear projection dome of claim 10 in which the projected light leaves the light guide through the narrow front edges and can be seen on the front side of the projection screen.

12. The rear projection dome of claim 4 in which vertical seams of the screen sections are positioned so that the image projected on the screen overlap, illuminating the light guides on either side of the vertical seam preventing a shadow.

13. A seamless, shadowless, rear projection full dome imaging system comprising;
    a) a 360° screen having a plurality of translucent screen sections,
    b) a rigid superstructure to which the screen sections are attached;
    c) clamping rings to hold the screen sections together;
    d) clamp arms to attach the screen sections to the superstructure;
    e) each of said clamping rings comprising an upper clamping ring and a lower clamping ring;
    f) a transparent light guide attached to each of said clamping rings;
    g) adjacent screen sections being held between adjacent light guides by said clamp arms;
    h) a plurality of projectors projecting a light image onto the rear of said screen sections;
    i) each of said light guides having a rear face angled to be perpendicular to the projected light;
    j) each of said light guides having a narrow front edge on the front side of the light guide, and,
    k) all surfaces of said light guides, except the faces angled perpendicular to the projected light and the narrow front edge being coated with a black opaque finish.

14. The rear projection dome of claim 13 in which the screen sections comprise a cap section, a plurality of conical sections and a cylindrical base section.

15. The rear projection dome of claim 13 in which the light guides are segmented and have a trapezoidal shape, so that when they are placed end to end they will form a faceted circular shape.

16. The rear projection dome of claim 13 in which the narrow front edges are tapered down to about the size of one pixel of the projected image.

17. The rear projection dome of claim 13 in which the projected light leaves the light guide through the narrow edges and can be seen on the front side of the projection screen.

18. The rear projection dome of claim 13 in which vertical seams of the screen sections are positioned so that the images projected on the screen overlap, illuminating the light guides on either side of the vertical seam, preventing a shadow.

* * * * *